Figure 1:
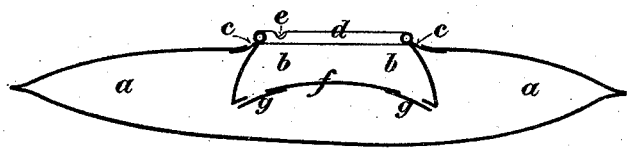

(No Model.) 2 Sheets—Sheet 1.

E. H. BOOTH & F. N. DYER.
SANITARY APPLIANCE FOR CHILDREN, &c.

No. 329,127. Patented Oct. 27, 1885.

Witnesses.
Harry Drury
Henry Bossert.

Inventors.
Edwin H. Booth
and
Frederick N. Dyer
by their Attorneys
Howson and Sons (No Model.) 2 Sheets—Sheet 2.
E. H. BOOTH & F. N. DYER.
SANITARY APPLIANCE FOR CHILDREN, &c.
No. 329,127. Patented Oct. 27, 1885.
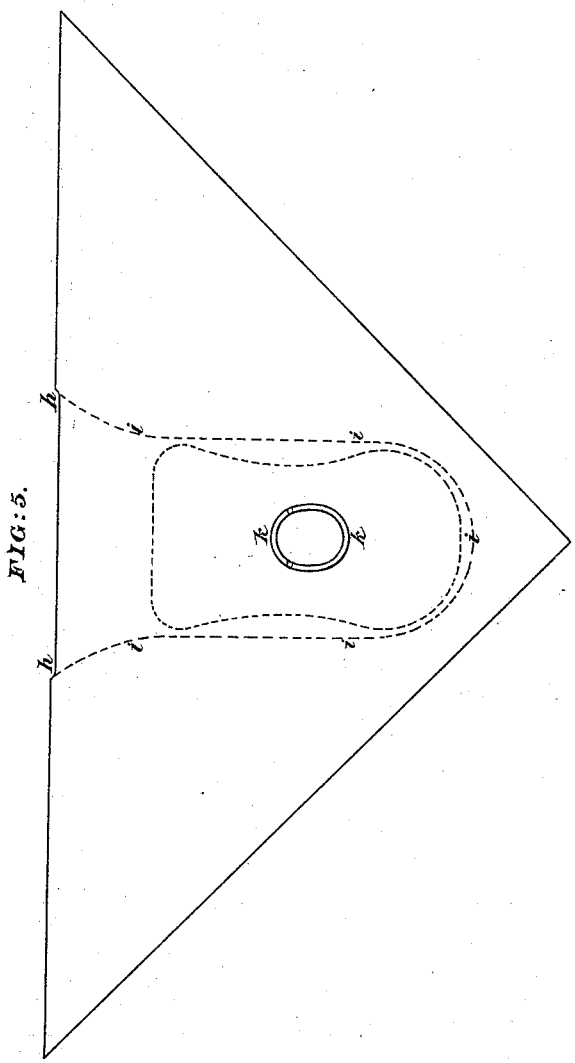
Witnesses.
Harry Drury.
Henry Bossert.
Inventors.
Edwin H. Booth
and
Frederick N. Dyer
by their Attorneys
Howson and Sons

UNITED STATES PATENT OFFICE.

EDWIN H. BOOTH, OF PRESTON, COUNTY OF LANCASTER, AND FREDERICK N. DYER, OF MACCLESFIELD, COUNTY OF CHESTER, ENGLAND.

SANITARY APPLIANCE FOR CHILDREN, &c.

SPECIFICATION forming part of Letters Patent No. 329,127, dated October 27, 1885.

Application filed April 27, 1885. Serial No. 163,561. (No model.) Patented in England October 16, 1884, No. 13,656, and in Canada May 20, 1885, No. 21,708.

*To all whom it may concern:*

Be it known that we, EDWIN HENRY BOOTH and FREDERICK NATHANIEL DYER, residing, respectively, at Preston, in the county of Lancaster, and Macclesfield, in the county of Chester, England, and subjects of the Queen of Great Britain and Ireland, have invented an Improved Sanitary Appliance for Children and others, (for which we have applied for a patent in Great Britain, No. 13,656, dated October 16, 1884,) of which the following is a specification.

The object of our invention is to provide a convenient ventilated sanitary appliance for receiving the urine and fæces from children, invalids, and other persons, and at the same time to keep the person perfectly dry, thereby preventing excoriation of the skin and other inconveniences.

The invention consists, principally, of a hollow spoon-shaped or oval receptacle composed of two portions, which we call the "shield" and "diaphragm," and of a suitable form to fit and inclose the parts, and made of a soft pliable water-proof material, and provided with ventilating-openings, which from their situation will admit air, but will not allow of the emission of any fluids thereby. This receptacle is also provided with a bag or vessel, to which it is connected, as hereinafter explained, and is fitted with self-acting valves, which will allow of the passage therefrom into the vessel of any fluid or semi-fluid matter, but not of the return thereof, and is both air and fluid tight. The parts of this appliance are so made that they can be easily taken asunder and turned inside out for cleansing purposes and readily put together again.

Such being the nature and object of our said invention, we will now proceed to describe in detail the manner in which the same is to be or may be performed or carried into practical effect; and in order that the same may be clearly understood, we have annexed hereunto two sheets of drawings illustrative thereof, and have marked the same with figures and letters of reference corresponding with those in the following explanation thereof.

The drawings represent, for the sake of illustration, the improved sanitary appliance as constructed for the reception of the urinary discharge only, but the additional arrangement for receiving the fæces will be fully described also.

Figure 2:
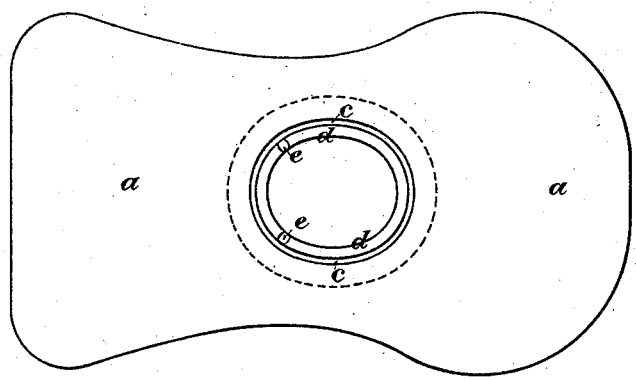
Figure 3:
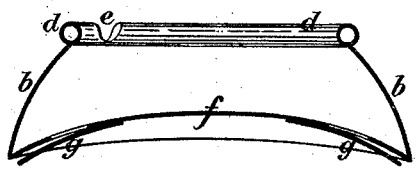
Figure 4:
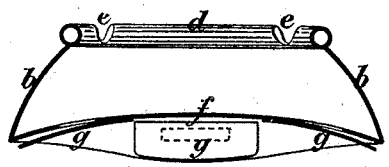

Figure 1 is a longitudinal section, and Fig. 2 a plan view, of the appliance complete. Figs. 3 and 4 are longitudinal and transverse sections of the shield, drawn full size, for a child, and Fig. 5 shows the method of combining the same with a napkin.

*a a* is the water-proof bag or vessel to hold the urine and fæces, and *b b* the shield. The bag *a a* is made with a central oval aperture edged with a strip, *c c*, of elastic india-rubber, which can be distended in order to remove and replace the shield, but will collapse again and fit close round the neck of the shield *b b*, and thus hold it in place. The shield is made of a curved or conical form to facilitate the flow of the urine or the fall of the fæcal matter into the bag or vessel *a a* and to prevent the return of either through the apertures, in whatever position the wearer may be. Round the exterior aperture of the shield is a soft continuous pad, *d d*, in which are made two or more notches or apertures, *e e*, to allow of ventilation and the escape of perspirable matter, and to prevent the shield from irritating the skin and to keep the same more securely in place. The ventilating-apertures may, if desired, be prolonged by suitably-placed tubes.

For urinary purposes the shield *b b* forms an elliptical hollow truncated cone, the smaller end toward the body and the larger end extending into the bag or vessel *a a*, and being closed by a diaphragm, *f f*, of suitable material, furnished with apertures fitted with valves *g g*, (preferably of the flap form, as shown,) for the passage of the urine into the bag or vessel *a a*, and its secure retention therein; or the shield may have the same diameter from end to end, because the pressure of the body and legs will throw the sides and ends into somewhat of the desired form; but this is, however, a less advantageous shape of shield than that shown on the drawings, and above described, whereby the discharged fluid flows down a steep declivity and an equally steep declivity opposes its return through the shield.

The shield *b b* may be either fixed in the aperture of the bag $a\ a$ or removable, in which latter case (which is preferable) it is fitted in the aperture of the bag, and securely held therein by a strip or edging of soft india-rubber, which fits round the neck formed between the shield and the pad $d\ d$; or the orifice of the bag may be strengthened and shaped into the form of a shield and act as such; but in this case, as also when the shield is fixed permanently, the diaphragm $f\ f$ must be made removable at will, because it is essential for purposes of cleanliness that the bag and shield should be readily turned inside out. This part of the appliance is also suitable for the use of menstruating women. The posterior shield is constructed on the same principle, but deepened and enlarged and modified to allow the fæces to fall from the body and to oppose on all sides and in all postures of the wearer a steep acclivity against their escape.

Where cheapness is requisite, the two shields may be combined in a figure-8-shaped shield, and one bag receive all the solid and fluid dejections; but this rude form must be worn only in an erect or sitting position.

The urinary and fæcal appliances may be worn separately or together, and they are to be kept in place by a suitable arrangement of bands or straps, or by means of an ordinary napkin. We prefer, however, especially for infants, to combine the appliance with a napkin in the manner shown at Fig. 5. A slit or opening is made in the napkin from $h$ to $h$, and a pocket is formed therein by stitching, as shown by the dotted line $i\ i$. An oval or elliptical aperture or perforation is also made in the napkin at $k\ k$, to allow of the projection through the same of the continuous pad $d\ d$.

We claim as our invention—

The herein-described sanitary appliance, consisting of a bag or vessel having an opening provided with a shield, $b$, and a valved diaphragm, substantially as set forth.

In testimony whereof we have signed our names to this specification in the presence of two subscribing witnesses.

E. H. BOOTH.
F. N. DYER.

Witnesses:
THOS. HESKIN,
JOHN VALENTINE.